United States Patent
Gates et al.

(10) Patent No.: US 11,698,816 B2
(45) Date of Patent: Jul. 11, 2023

(54) LOCK-FREE WORK-STEALING THREAD SCHEDULER

(71) Applicant: HEWLETT PACKARD ENTERPRISE DEVELOPMENT LP, Houston, TX (US)

(72) Inventors: Matthew S. Gates, Houston, TX (US); Joel E. Lilienkamp, Ft. Collins, CO (US); Alex Veprinsky, San Jose, CA (US); Susan Agten, Boise, ID (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 261 days.

(21) Appl. No.: 17/008,549

(22) Filed: Aug. 31, 2020

(65) Prior Publication Data
US 2022/0066831 A1    Mar. 3, 2022

(51) Int. Cl.
| | | |
|---|---|---|
| G06F 9/50 | (2006.01) | |
| G06F 9/48 | (2006.01) | |
| G06F 9/54 | (2006.01) | |
| G06F 12/0811 | (2016.01) | |
| G06F 12/0817 | (2016.01) | |

(52) U.S. Cl.
CPC .......... *G06F 9/5027* (2013.01); *G06F 9/4881* (2013.01); *G06F 9/544* (2013.01); *G06F 12/0811* (2013.01); *G06F 12/0817* (2013.01); *G06F 2212/1024* (2013.01); *G06F 2212/2542* (2013.01)

(58) Field of Classification Search
CPC .......... G06F 9/5027; G06F 2212/2542; G06F 12/0811; G06F 12/0817; G06F 2212/1024; G06F 9/4881; G06F 9/544
See application file for complete search history.

(56) References Cited

U.S. PATENT DOCUMENTS

| | | | | |
|---|---|---|---|---|
| 6,735,769 | B1 * | 5/2004 | Brenner | G06F 9/505 |
| | | | | 718/103 |
| 9,342,384 | B1 * | 5/2016 | Lewis | G06F 9/544 |
| 9,411,636 | B1 * | 8/2016 | Ting | G06F 9/4881 |
| 10,936,369 | B2 * | 3/2021 | Nguyen | G06F 9/5016 |

(Continued)

OTHER PUBLICATIONS

Wikipedia.org. "Compare-and-swap". https://en.wikipedia.org/wiki/Compare-and-swap. Accessible Jan. 8, 2017. (Year: 2017).*

(Continued)

*Primary Examiner* — Michael W Ayers
(74) *Attorney, Agent, or Firm* — Yao Legal Services, Inc.

(57) ABSTRACT

Systems and methods are provided for lock-free thread scheduling. Threads may be placed in a ring buffer shared by all computer processing units (CPUs), e.g., in a node. A thread assigned to a CPU may be placed in the CPU's local run queue. However, when a CPU's local run queue is cleared, that CPU checks the shared ring buffer to determine if any threads are waiting to run on that CPU, and if so, the CPU pulls a batch of threads related to that ready-to-run thread to execute. If not, an idle CPU randomly selects another CPU to steal threads from, and the idle CPU attempts to dequeue a thread batch associated with the CPU from the shared ring buffer. Polling may be handled through the use of a shared poller array to dynamically distribute polling across multiple CPUs.

20 Claims, 7 Drawing Sheets

(56) References Cited

U.S. PATENT DOCUMENTS

| | | | | |
|---|---|---|---|---|
| 11,388,074 B2* | 7/2022 | McCarthy | | H04L 43/022 |
| 2003/0005029 A1* | 1/2003 | Shavit | | G06F 9/4493 |
| | | | | 718/107 |
| 2003/0037091 A1* | 2/2003 | Nishimura | | G06F 9/4881 |
| | | | | 718/103 |
| 2007/0300227 A1* | 12/2007 | Mall | | G06F 9/3851 |
| | | | | 712/E9.053 |
| 2008/0104593 A1* | 5/2008 | Parekh | | G06F 9/4881 |
| | | | | 718/100 |
| 2011/0276978 A1* | 11/2011 | Gaiarsa | | G06F 9/5033 |
| | | | | 718/104 |
| 2011/0296420 A1* | 12/2011 | Pegushin | | G06F 11/3404 |
| | | | | 718/102 |
| 2013/0117331 A1* | 5/2013 | Schreter | | G06F 12/023 |
| | | | | 707/E17.04 |
| 2017/0031724 A1* | 2/2017 | Xue | | G06F 9/505 |
| 2017/0075734 A1* | 3/2017 | Raman | | G06F 9/5038 |
| 2018/0365019 A1* | 12/2018 | Rossi | | G06F 9/3877 |
| 2021/0117238 A1* | 4/2021 | Shveidel | | G06F 9/4881 |

OTHER PUBLICATIONS

DPDK Project, "Developer Quick Start Guide: Learn How To Get Involved With DPDK", available online at <https://web.archive.org/web/20200828132707/https//www.dpdk.org/>. Aug. 28, 2020, 4 pages.

SPDK, "Storage Performance Development Kit", available online at <https://web.archive.org/web/20200806010020/https//spdk.io/>. Aug. 6, 2020, 2 pages.

* cited by examiner

LOCK-FREE WORK-STEALING THREAD SCHEDULER

DESCRIPTION OF RELATED ART

The advent of technology has led to an exponential growth in the computational power of computing systems. Use of multi-processor (e.g., multi computer processing unit or CPU) devices and multi-core processors (which include a number of cores or processor) in computing systems, has also contributed to the increase in computational power of computing systems. Each of the cores or processors may include an independent cache memory.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
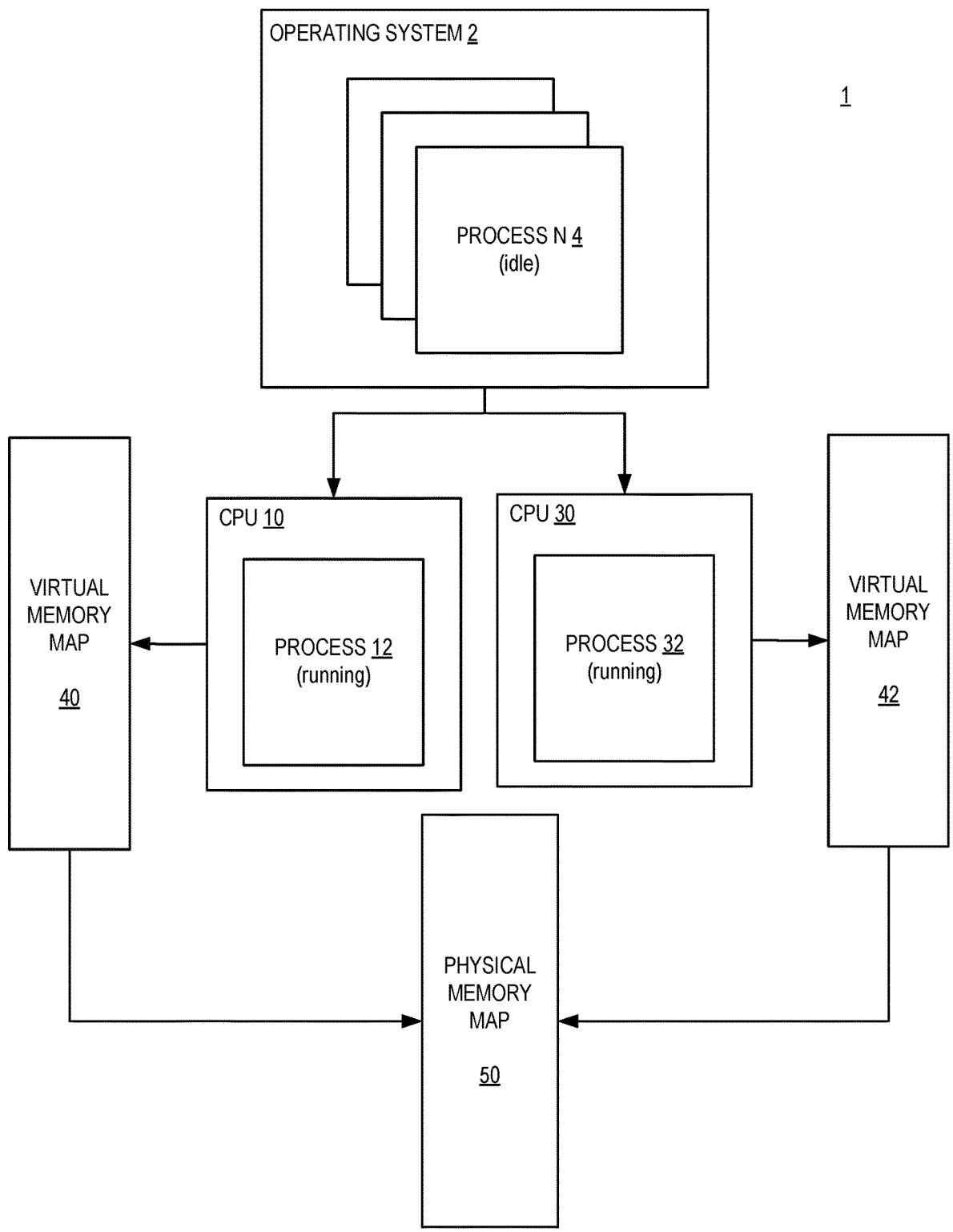
FIG. 1A illustrates an example of a hardware computing system within which various embodiments may be implemented.

The figures are not exhaustive and do not limit the present disclosure to the precise form disclosed.

DETAILED DESCRIPTION

Processors or CPUs refer to electronic circuitry within a computer that carries out the instructions of a computer program by performing the basic arithmetic, logical, control and input/output (I/O) operations specified by the instructions. Processing performance of computers can be increased by using multi-core processors or CPUs, which essentially amounts to plugging two or more individual processors (called cores in this sense) into one integrated circuit. Ideally, a dual core processor would be nearly twice as powerful as a single core processor, although in practice, the actual performance gain may be smaller. Increasing the number of cores in a processor (i.e. dual-core, quad-core, etc.) increases the workload that can be handled in parallel. This means that the processor can now handle numerous asynchronous events, interrupts, etc. With multi-processor computers or systems, however, more than a single processor or CPU can be supported, e.g., two to eight or even many more CPUs, such as may be the case with petascale supercomputers and exascale supercomputing systems.

Generally, the memory of a computing system includes a main memory, such as a non-volatile memory (NVM), and a cache memory (or simply, cache). The main memory can be a physical device that is used to store application programs or data in the computing system. The cache stores frequently accessed data so that time need not be spent accessing the data from the main memory. Typically, data is transferred between the main memory and the cache in blocks of fixed size, referred to as cache lines. When a processor of the computing system has to read from or write to a location in the main memory, the processor reads from or writes to the cache if the data is already present in the cache, which is faster than reading from or writing to the main memory. Data that is written to the cache, is generally written back to the main memory.

In a multi-compute-engine system, each compute engine, such as a core or a processor may have multiple threads, and may include one or more caches, and generally, a cache is organized as a hierarchy of one or more cache levels. In conventional multi-compute-engine systems, threads typically run until the thread yields, sleeps, or exits, where each logical thread can be assigned to a CPU at the time the logical thread was created. Successive CPUs are chosen, e.g., in a round-robin fashion, for assignment to a logical thread, and only the assigned CPU is able to run the thread. However, such a scheduling mechanism lacks a way to balance work across multiple CPUs, and some CPUs may become saturated while others sit virtually idle. The saturated CPUs can become a bottleneck resulting in lower I/O performance that could be achieved if the same amount of work was balanced across more CPUs. Moreover, performance variations can result between boot cycles or between array nodes, because the round robin CPU assignment can vary each time a node is booted.

Accordingly, various embodiments are directed to thread scheduling that is lock-free, and allows threads to be run by different CPUS dynamically at runtime. In some embodiments, a scheduler may follow a particular scheduling algorithm, where the following is performed: (1) threads are assigned to local CPU run queues; (2) threads are placed in a ring buffer shared by all CPUs when the threads become ready to run; (3) when a CPU's local run queue is cleared, that CPU checks the shared ring buffer to determine if any threads are waiting to run on that CPU, and if so, the CPU pulls a batch of threads related to that ready-to-run thread and places the threads in its local run queue; (4) if not, an idle CPU randomly selects another CPU to steal threads from (preferably a closer CPU), and the idle CPU attempts to dequeue a thread batch associated with the CPU from the shared ring buffer—this can be repeated if a selected CPU does not have any related threads in the shared ring buffer; (5) the idle CPU executes the thread batch stolen from the other CPU in its local run queue in priority order; (6) the process repeats for each idle CPU. As will be described below, a scheduler may be implemented in software executable, e.g., at the node level.

FIG. 1A illustrates an example of a hardware computing system 1 comprising mufti-core processors or CPUs, the processing threads of which may be balanced in accordance with various embodiments. A system, such as hardware computing system 1, may comprise various elements or components, circuitry, software stored and executable thereon, etc. However, for simplicity and ease of explanation, only a few aspects are illustrated and described.

Hardware computing system 1 may include an operating system or OS 2 in which one or more processes containing zero or more threads may be running (or idle) on multiple CPUs (10 and 30). As described herein, a process may have the ability to create a thread, which in turn creates another "lightweight" process that shares the "parent" process's data, but that can be run independently on another processor at the same time as the parent process. For example, a process N 4 (along with other processes) may be idle in operating system 2, while other processes, e.g., processes 12, 32 may be running on CPUs 10 and 30, respectively. FIG. 1A further illustrates a high-level flow for memory maps of each executing process involving virtual memory map 40 for CPU 10 and virtual memory map 42 for CPU 30, and physical memory map 50.

Figure 1B:
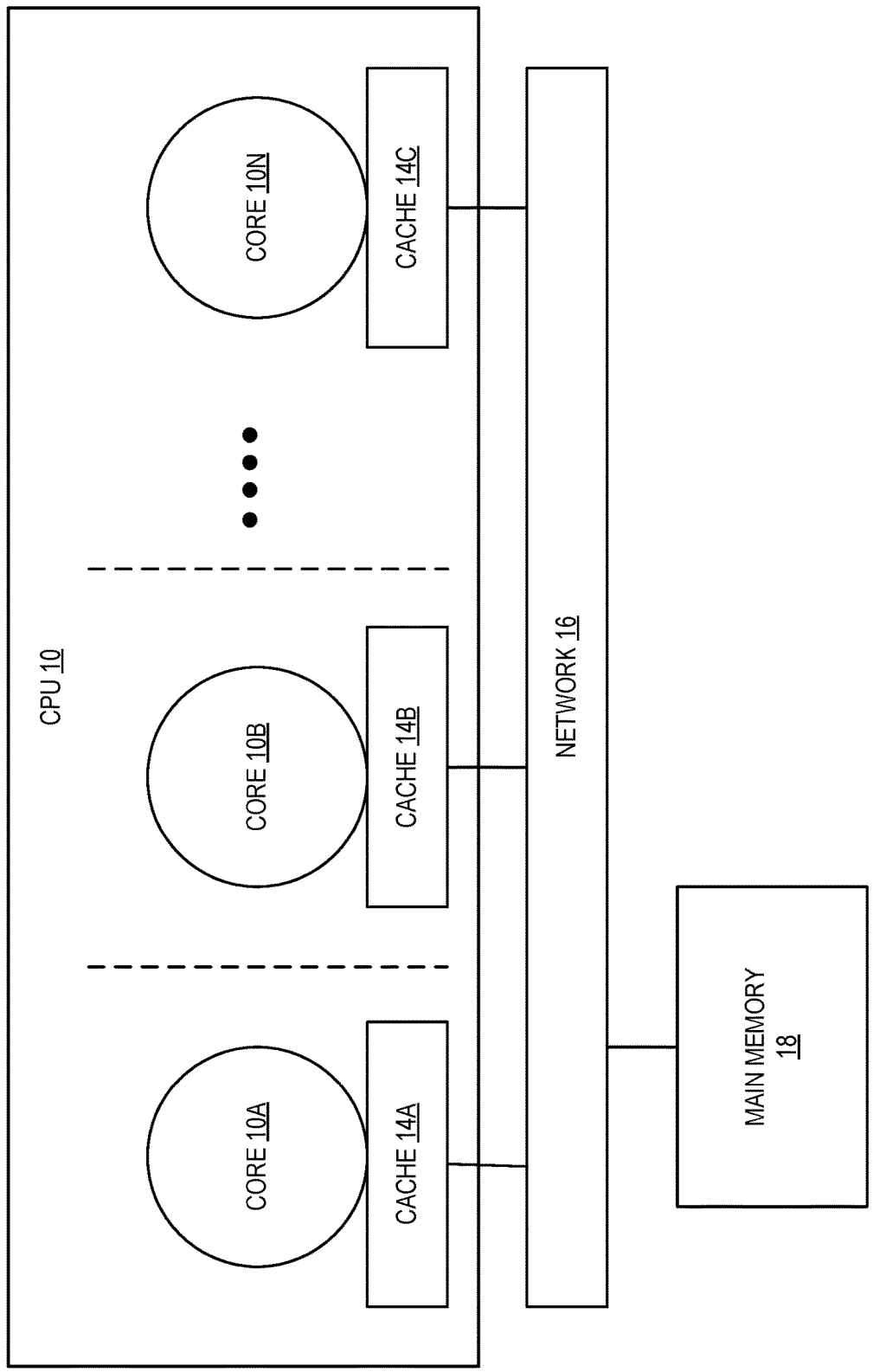
FIG. 1B illustrates an example one-to-many core processing system architecture of one processor in the hardware computing system of FIG. 1A.

FIG. 1B illustrates an example architecture of CPU 10 of FIG. 1A. In one example, CPU 10 may be operable on a directory-based protocol to achieve cache coherence. CPU 10 may be, for example, a multi-processor system, one-to-many core system, or a multi-core processor system. Accordingly, CPU 10 may comprise multiple processors or cores, and in this example, may include multiple cores 10A, 10B, . . . 10N.

Each of the cores 10A, 10B, . . . 10N, may have one or more cache levels 14A, 14B . . . 14N associated with them, respectively. A network 16 (which may be a system bus) allows cores 10A, 10B, . . . 10N to communicate with each other as well as with a main memory 18 of CPU 10. Data of main memory 10 may be cached by any core of CPU 10, for example, any of cores 10A, 10B . . . 10N.

Referring back to FIG. 1A, CPUs 10, 30 each implement a virtual memory management system. For example, CPU 10 generates memory references by first forming a virtual address, representing the address within an entire address range by the architectural specifications of the computer or that portion of it allowed by operating system 2. The virtual address may then be translated to a physical address in physical memory map 50 constrained by the size of main memory. In some embodiments, translation is done with pages, so a virtual page address for a page in virtual memory map 40 is translated to a physical address for a page in physical memory map 50. A page table is maintained in memory to provide the translation between virtual address and physical address, and usually a translation buffer (not shown), is included in the CPU to hold the most recently used translations so a reference to a table in memory 18 need not be made to obtain the translation before a data reference can be made.

As alluded to above, various embodiments are directed to work-stealing to allow threads, e.g., threads to be run by different CPUs dynamically at runtime. In this way, work is balanced among available CPUs without overloading any particular CPU and/or creating a bottleneck(s) in processing. In some embodiments, the work-stealing algorithm according to which a local CPU scheduler operates (e.g., scheduler 314 (FIG. 3) embodies a lock-free approach. Locking can refer to a mechanism whereby a serialization resource protects data from being accessed by many threads. That is, typically, a core may acquire a spin lock in order to allow access to data structures to be synchronized and to avoid any processing contention(s) between incoming/outgoing packets. However, locking can result in wasted CPU cycles/spinning while waiting to acquire a lock. Especially in the case of modern systems having upwards of, e.g., 100 cores per system, conventional thread scheduling would severely prohibit (hardware) scaling and/or potentially result in high latency.

Figure 2A:
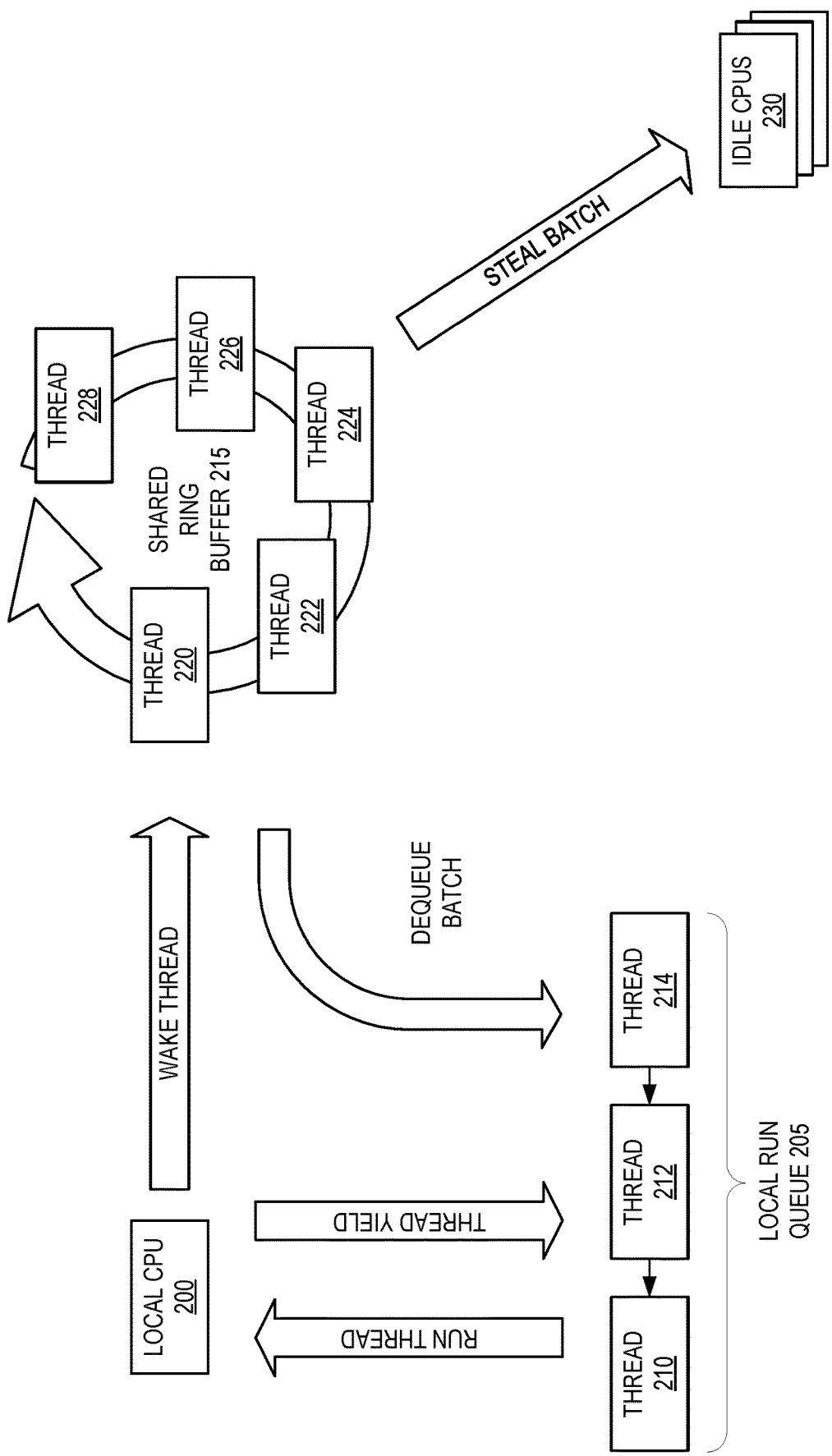
FIG. 2A illustrates an example thread scheduling workflow in accordance with various embodiments.

FIG. 2A illustrates an example workflow to implement a lock-free work-stealing approach to scheduling threads in accordance with one embodiment. A local CPU 200 is illustrated in FIG. 2A, where local CPU 200 may have a local run queue 205 including threads 210, 212, 214 to be run by local CPU 200. As noted above, a CPU may have one or more cores. Threads may be created within each CPU core for processing requests. One thread may be created per CPU core, but multiple threads are also possible. Threads typically continue running as long as there is work to do, i.e., a request needs to be processed. It should be understood that a thread can refer to a basic unit of CPU utilization, and may include a program counter, stack, and set of registers. Threads run in the same memory context, and can share the same data while executing. A thread is what a CPU may actually run, and access to shared resources, e.g., the CPU, are scheduled accordingly. In contrast, a process involves or initiates a program, and a process may encompass/comprise one or more threads (the thread being a unit of execution in the process). And, whereas threads use address spaces of the process, when a CPU switches from one process to another, current information is saved in a process descriptor, and information of the new process is loaded.

As illustrated in FIG. 2A, a shared ring buffer may be implemented and made accessible to each CPU. That is, in some embodiments, each CPU, such as CPU 200 may have implemented therein or may have access to a cache or queue of threads to be run by the CPU. In contrast to conventional system, where threads may be assigned to a particular CPU, threads are queued in a shared ring buffer, e.g., shared ring buffer 215. It should be noted that any appropriate data structure or mechanism may be used to queue upcoming threads to be run by CPU 200. The shared ring buffer is simply one manner of implementing such a thread queue. Other data structures or memory mechanisms can be used to queue up threads in accordance with other embodiments.

It should be understood that shared ring buffer 215 may be implemented in physical/main memory (e.g., memory 18 of FIG. 1B) that each CPU in a system may access. In some embodiments, the shared ring buffer 215 may be implemented locally in software, e.g., as a buffer that local CPUs can access. It should be further noted that data coherency can be maintained in hardware, i.e., the work-stealing algorithm need not have to consider data coherency. For example a node controller controlling a node to which a CPU may belong can maintain a coherency directory cache for example to ensure data coherency between main memory and local memory, and the atomic instructions used to implement the work-stealing algorithm acts on shared memory already. Accordingly, locks are not utilized or needed.

In operation, local CPU 200 may place any awakened threads into its shared ring buffer, in this case, shared ring buffer 215. Threads can be created by a fork or similar function(s) in a computer program. In other instances, threads may be woken by, e.g., a cron job, where the thread will be woken according to some designated timer/after the passage of some designated period of time. When awakened, threads can be put by local CPU 200 into shared ring buffer 215. As illustrated in FIG. 2A, threads 220-228 currently reside in shared ring buffer 215. As this point, threads 220-228 remain unassigned to any particular CPU.

It should be noted that each thread may have an allowed set of CPUs on which it can run, and this allowed set can be programmable and determined, e.g., by a developer that creates the thread and defines its attributes. For example, a thread may be set for creation on a particular node, in which case, a particular non-uniform memory access (NUMA) affinity can be set for a particular CPU/memory. For example, a thread may be set for creation on a particular CPU (CPU affinity). For example, a thread may have no affinity in which case, any CPU can run the thread. It should be understood that NUMA refers to a memory design, the architecture of which can include a plurality of nodes interconnected over a symmetric multiprocessing (SMP) system. Each node itself can be a small-scale SMP, comprising several processor sockets that include processors/CPUs, and associated memory interconnected amongst themselves, with the memory within the node being shared by all of the CPUs. Memory within a node may be considered local memory to the CPUS of the node, while memory of other nodes may be considered remote memory. Node controllers within each node enable the CPUs to access remote memory within the system. A node controller may be considered an advanced memory controller, managing access to some or all of the local memory and the node's CPUs' access to remote memory. A scheduler in accordance with various embodiments may be implemented in software executing on the node, e.g., in a node controller.

Taking the case of a thread having a particular CPU affinity, as an example, when the thread is awakened (as described above), the thread is associated with the CPU to which the awakened thread is constrained (due to specified affinity). As noted above, the CPU, in this case, local CPU 200, happens to be the CPU to which the thread is to be run. Thus, CPU 200 places the thread into shared ring buffer 215.

In order to run one or more threads currently queued in shared ring buffer 215, local CPU 200 may dequeue threads in batches or one at a time (although batch dequeuing can be more efficient). That is, each dequeue operation on shared ring buffer 215 may have some associated latency (memory overhead), and processing thread batches amortizes this latency/delay by fetching multiple items in a single dequeue operation. It should be understood that a batch can amount to any number between one and a size of the shared ring buffer, although a default maximum thread batch size can be chosen based, e.g., on testing and tuning of the algorithm according to which embodiments operate. It should be noted that the implementation of a shared ring buffer, e.g., shared ring buffer 215 provides an interface by which to dequeue up to N items (threads) in a single call, and place them in a return buffer to be processed by the caller. Upon dequeuing a batch of threads from shared ring buffer 215, the dequeued threads may be put into local run queue 205. Depending on the specified affinity, e.g., to a particular CPU, or a particular node or processor socket (in the case of NUMA affinity), only a particular CPU/set of CPUs may be able to dequeue a batch of threads. In the case of a thread having no affinity, any CPU can dequeue the thread.

When threads are in local run queue 205, local CPU 200 may run those threads, in this example, threads 210-214. In some embodiments, local CPU 200 may run threads 210-214 in priority order, but this is not necessarily a requirement, and threads can be executed in another order or any order for that matter. That is, local CPU 200 may run a thread, e.g., thread 210. When a thread yields back to a current context, local CPU 200 may run another thread, which in this case, can be threads 212, 214, and so on.

When CPUs are idle, i.e., they have no threads to run, such as idle CPU 230, it may "steal" work or a batch as threads queued in shared ring buffer 215. Idle CPUs, such as idle CPU 230 may steal a batch(es) of threads from shared ring buffer if there is no affinity associated with the batch of threads that would prevent idle CPU 230 from running that batch of threads. For example, idle CPU 230 may fall within some set of CPU/NUMA affinity. If idle CPU 230 cannot run a batch of threads, those threads are left on shared ring buffer 215. It should be noted that all threads can be sent to shared ring buffer 215 regardless of affinity because the shared ring buffer 215 in which the threads are sent corresponds to the affinity of a thread. That is, for each shared ring buffer, only CPUs able to execute threads (also referred as tasks) with an affinity corresponding to the shared ring buffer will attempt to dequeue threads therefrom. Upon stealing a batch of threads, similar to the operation of local CPU 200, idle CPU 230 dequeues the batch of threads from shared ring buffer 215. Idle CPU 230 may put the dequeued batch of threads into its own local run queue (not shown) to be executed, and (no longer idle) CPU 230 may execute the threads.

As noted above, each CPU may have at least one shared ring buffer that an idle CPU, barring any affinity that would prevent an idle CPU from running a batch of threads, may steal. An idle CPU can be local to the CPU whose shared ring buffer the idle CPU may steal from or the idle CPU can be remote from the CPU whose shared ring buffer the idle CPU may steal from depending on the architecture of the system to which the CPUs belong. For example, as alluded to above, a system may have a plurality of nodes interconnected, wherein each of the nodes comprises one or more CPUs.

When an idle CPU seeks to steal work (threads) from another CPU, the idle CPU may randomly select another CPU in the system from which it can try to steal work. In some embodiments, a hyperthread- and NUMA-aware selection algorithm can be used. In some embodiments, such an algorithm "prefers" stealing from CPUs that may be closer in terms of CPU cache locale. In some embodiments, an idle CPU may prefer to attempt to steal from a shared ring buffer associated with a non-idle CPU that is in the same processor socket as the idle CPU.

If a shared ring buffer from which an idle CPU wishes to steal work is empty, the idle CPU can proceed to another randomly-selected CPU from which to steal. It should be noted that because each CPU is associated with/has at least one shared ring buffer onto which threads can be put and from which threads can be stolen/taken, the more hardware (CPUs) are added to a system, the more scalability is possible/the better the processing speed.

Recalling that the primary mechanism of extracting better performance from a system is to add more CPUs, the commensurate addition of more shared ring buffers results in potentially more CPUs sharing threads dynamically in more balanced manner than is possible with conventional systems. Moreover, simply adding more CPUs without a work-stealing mechanism that is lock-free, such as that described herein, will tend to result in more contention between CPUs attempting to run the same threads, and more latency because more CPU cycles may be missed due to locking. In accordance with various embodiments, there is no contention experienced between CPUs with respect to the shared buffer ring except when stealing work and/or when a remote wake is involved. In particular, remote waking can refer to a situation where a CPU cannot place a ready thread on its own shared ring buffer due to affinity restrictions (or some other reason), and thus the thread is placed on another CPU's shared ring buffer. If the other CPU is also accessing that same shared ring buffer at the same time, cache line contention arises.

If the idle CPU's search for other CPUs' work to steal does not result in other threads to run, the idle CPU may go to sleep until new work arrives. This saves an idle CPU from consuming too many system CPU cycles. When an idle CPU goes to sleep can be based on a determined number of CPU cycles over which CPU will poll for work, e.g., a threshold number of CPU cycles. In some embodiments, a predictive algorithm can be used that bases when an idle CPU goes to sleep on the number of CPU cycles it has previously taken to find (steal) work. There are other contemplated mechanisms that can be used to determine how long a CPU will search for work and/or how long it will be before a CPU will go to sleep without having found any work to steal.

When a non-idle CPU, e.g., CPU 200, runs out of work, i.e., its local run queue 205 goes empty, the CPU first checks its shared ring buffer, in this case, shared ring buffer 215, to determine if any threads queued therein are waiting to run on CPU 200. If so, CPU 200 pulls a batch of threads waiting to run thereon, and places them in local run queue 205. CPU 200 may then execute each thread in priority order.

Figure 2B:
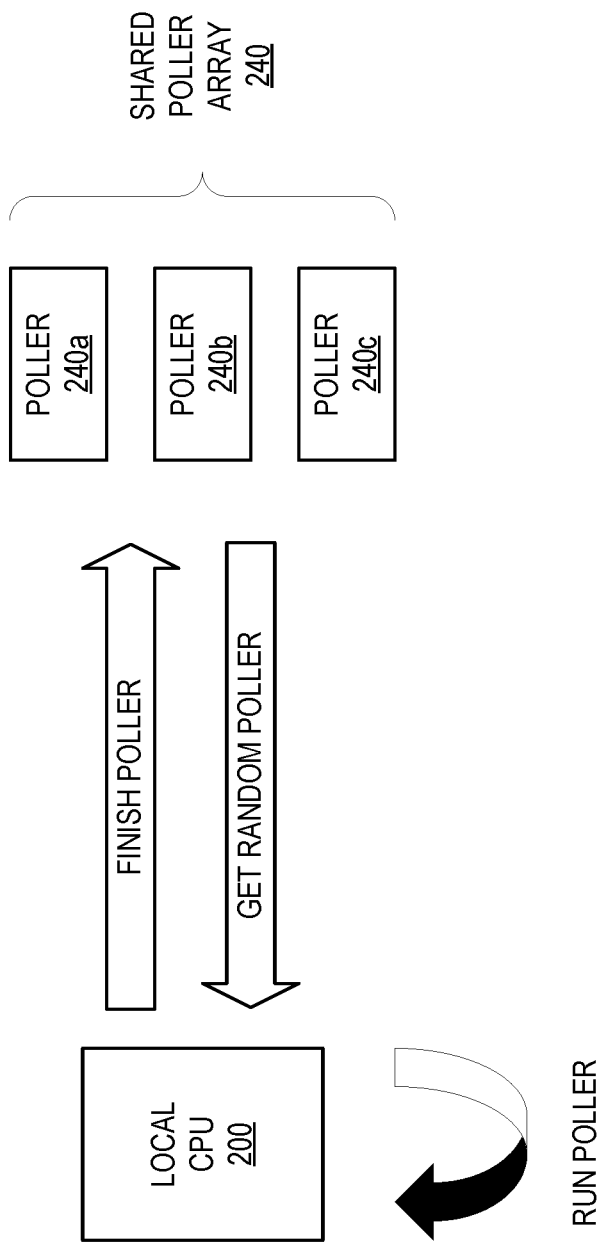
FIG. 2B illustrates an example polling workflow in accordance with various embodiments.

Referring now to FIG. 2B, a polling architecture is described. It should be understood that a poller can refer to a callback function that may be periodically invoked by the scheduler disclosed herein to check for some condition, e.g., work that needs to be performed. Pollers can often replace interrupt service routines which typically only exist in kernel-mode code.

Previous kernel drivers utilized device interrupts, but interrupts directly to a user mode were not feasible, so a polling model was used in which polling routines did as little as possible just to determine if work to be done exists, and if so, a "bottom half" thread could be triggered to perform the actual work. Pollers are different from threads in that they typically comprise a single routine which is repeatedly invoked, typically run to completion, and which then returns back to the scheduler, although pollers can be implemented in threads. Thus, the aforementioned polling model runs poller threads on dedicated CPUs in each processor socket. The bottom half threads could be run on other CPUs in the same physical processor socket as the poller threads (alongside other threads, but at a higher priority). However, similar to the above-described issues with CPU bottlenecks, using dedicated CPUs for poller threads can result in under or over-provisioning of CPU resources for polling.

Accordingly, the polling architecture illustrated in FIG. 2B, and further described below, uses a distributed scheme in which polling work can be interleaved with "regular" thread execution across all CPUs in a system. In this way, a system is able to scale more easily by distributing polling dynamically across all CPUs in a processor socket as opposed to using a dedicated set of CPUs to handling polling.

In some embodiments, a shared array of pollers 240 may be implemented in a system, where each of the pollers in the array may be associated with a particular socket, e.g., NUMA socket. For example, as illustrated in FIG. 2B, a shared array of pollers 240 includes pollers 240a, 240b, and 240c, each of which can be registered with a particular processor socket that all CPUs in the processor socket can read. Each of the pollers 240a, 240b, and 24c may have an atomic flag indicating whether or not it is running on a particular CPU, i.e., a running flag that can be implemented as an atomic variable. It should be noted that any changes to a shared poller array, such as shared poller array 240, can be effectuated when pollers are registered or unregistered (which is typically a rare occurrence), and wherein a Read-Copy-Update (RCU)-type scheme is utilized.

Each time a thread yields a CPU in this example, local CPU 200, back to the scheduler/scheduling algorithm, the scheduler attempts to run a poller prior to scheduling the next thread to be executed. That is, when local CPU 200 experiences/performs a thread or thread scheduling loop, a poller may be selected at random from shared poller array 240. One of pollers 240a, 240b, or 240c may be selected e.g., poller 240a, and an attempt is made to atomically set that poller 240a's running flag using a compare-and-swap (CAS) operation. If the CAS operation succeeds, poller 240a is "claimed" to be run on local CPU 200, and no other CPU will be able to run poller 240a in parallel. Local CPU 200 may then execute poller 240a, clear its running flag, and release it to run again elsewhere (execute at another CPU). If the CAS operation fails, local CPU 200 can either retry running the polling thread using another randomly selected poller, or local CPU 200 can give up running the poller thread (for the moment), and can schedule the next thread to be run (as described above). It should be noted that the number of attempts to run a poller can be configured at runtime. In some embodiments, attempting to run one poller per scheduling cycle may be the default mode of operation. In this way, all CPUs in a processor socket can efficiently share dispatching multiple pollers among themselves with minimal overhead. The cost of trying to find a poller to run can simply amount to generating a random index in the shared poller array, e.g., shared poller array 240, and then a single CAS instruction to attempt to claim a poller at that index. This incurred cost is cheap enough that poller selection can be done in between each thread execution/yield cycle without introducing significant additional processing latency in the scheduler.

It should be noted that use of the aforementioned polling architecture can result in a poller less likely being selected if the poller has not found work to do for some period of time. This allows polling to exhibit a preference for more active devices. For example, a storage array may be experiencing heavier activity on a particular frontend or backend device port(s) while other ports are idle. Rather than wasting time polling idle ports too often, resources can be better leveraged for polling busy ports, thereby delivering lower latency to requests on those ports. In some embodiments, this active device preference can be achieved by implementing a counter for each poller, where a count is accumulated based on the number of cycles in which a particular poller has been called, but the poller has not found any work to perform. When an accumulated count for a particular poller meets or exceeds a threshold, for example, a "delay order" counter can be incremented for that particular poller. On the other hand, when a randomly selected poller does find work to perform, the delay order counter can be reset to zero. Moreover, each CPU performing polling may maintain a sequence number that can be incremented each time the CPU attempts to find a poller to execute (described above). Thus, when the CPU selects a poller, e.g., when local CPU 200 selects poller 240a, local CPU 200 checks its current sequence number is divisible by $2^N$, where N can refer to the selected poller's (poller 240a in this case) delay order. In other words, local CPU 200 can check if the following expression is true:

(my_sequence_number MOD (1<<poller_delay_order))
==0

If the expression is true, the selected poller, e.g., poller 240a, can execute. If the expression is false, local CPU 20 may skip poller 240a, and select another poller, in this case either poller 240b or poller 240c. Such a mechanism/logic results in a poller that will tend to execute roughly every $2^N$ times it is considered. If N==0 (the poller is active), the poller executes every time it's considered. However, the longer a poller sits idle, its delay order counter increments further, and thus, that poller executes less frequently over time. It should be noted that a maximum cap or threshold can be placed on how large the delay order can grow/accumulate to so that each poller is nevertheless executed with some reasonable amount of frequency.

Figure 3:
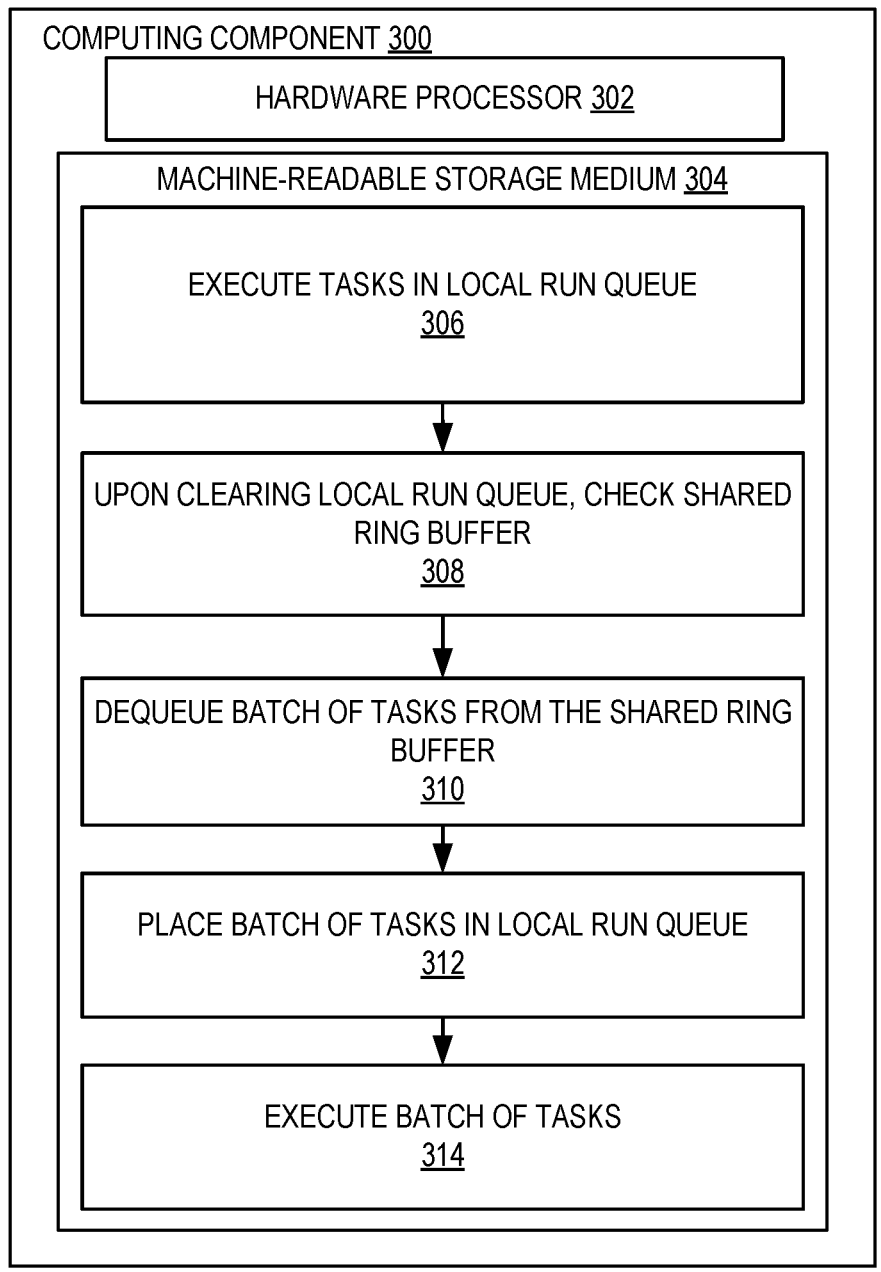
FIG. 3 illustrates an example computing component capable of executing instructions for effectuating thread scheduling in accordance with various embodiments.

FIG. 3 is an example computing device 300 in accordance with embodiments of the present disclosure. Where operations and functionality of computing device 300 are the same or similar to those discussed with respect to FIG. 2A, the description should be interpreted to apply. For example, computing device 300 may be an embodiment of a node, a node controller, a CPU such as CPU 10 or 30. Computing device 300 includes one or more hardware processors 302 that may be one or more central processing units (CPUs), semiconductor-based microprocessors, and/or other hardware devices suitable for retrieval and execution of instructions stored in machine-readable storage medium, 304. The one or more hardware processor 302 may fetch, decode, and execute instructions, such as instructions 306-314, to control processes or operations for effectuating error detection and control in the context of coherency directory caches in accordance with one embodiment. As an alternative or in addition to retrieving and executing instructions, the one or more hardware processors 302 may include one or more electronic circuits that include electronic components for performing the functionality of one or more instructions, such as a field programmable gate array (FPGA), application specific integrated circuit (ASIC), or other electronic circuits.

The one or more hardware processors 302 are configured to execute instructions stored on a machine-readable medium 304. Machine readable medium 304 may be one or more types of non-transitory computer storage mediums. Non-limiting examples include: flash memory, solid state storage devices (SSDs); a storage area network (SAN); removable memory (e.g., memory stick, CD, SD cards, etc.); or internal computer RAM or ROM; among other types of computer storage mediums. The instructions stored on the machine-readable medium 304 may include various sub-instructions for performing the function embodied by the identified functions.

The one or more hardware processors 302 may execute instruction 306 to execute threads in a local run queue. As noted above, a CPU, e.g., local CPU 200 (FIG. 2A) may have/may place threads to be executed in a local run queue, e.g., local run queue 205, that is specific to the CPU (meaning other CPUs cannot steal or perform any work for threads in another CPU's local run queue. In some embodiments, the CPU may execute the threads in the local run queue in priority order.

The one or more hardware processors 302 may execute instruction 308 to check a shared ring buffer upon clearing the local run queue. For example, if local CPU 200 no longer has threads to be run remaining in local run queue 205, it has become an idle CPU, and local CPU 200 may check shared ring buffer 215 to which it has access. Local CPU 200 is checking the shared ring buffer 215 to determine if there are any threads to be performed by local CPU 200, e.g., a certain thread(s) may have a specific affinity to local CPU 200. If there are no particular threads for local CPU 200 specifically to run, local CPU 200 may steal any threads from shared ring buffer 215 that it can run. That is, local CPU 200 may steal any threads that have an affinity to a set of CPUs to which local CPU 200 belongs, a particular NUMA affinity, or have no affinity at all (meaning any available CPU can execute the thread(s). It should be understood that other idle CPUs, such as idle CPU 230, may also check the shared ring buffer to determine if they can steal any threads.

Accordingly, the one or more hardware processors 302 may execute instruction 310 to dequeue a batch of threads from the shared ring butter. For example, local CPU 200 may remove a batch of threads it is allowed to run from shared ring buffer. The one or more hardware processors 302 may further execute instruction 312 to place the batch of threads in the local run queue. That is, local CPU 200 may put that dequeued batch of threads into its own local run queue 205 to be executed, e.g., in priority order. The one or more hardware processors 302 may execute instruction 312 to execute/run the batch of threads. Now that the dequeued batch of threads the local CPU 200 took from shared ring buffer 215 can be run, local CPU 200 may run a thread until the thread yields, run a subsequent thread, and so on.

Figure 4:
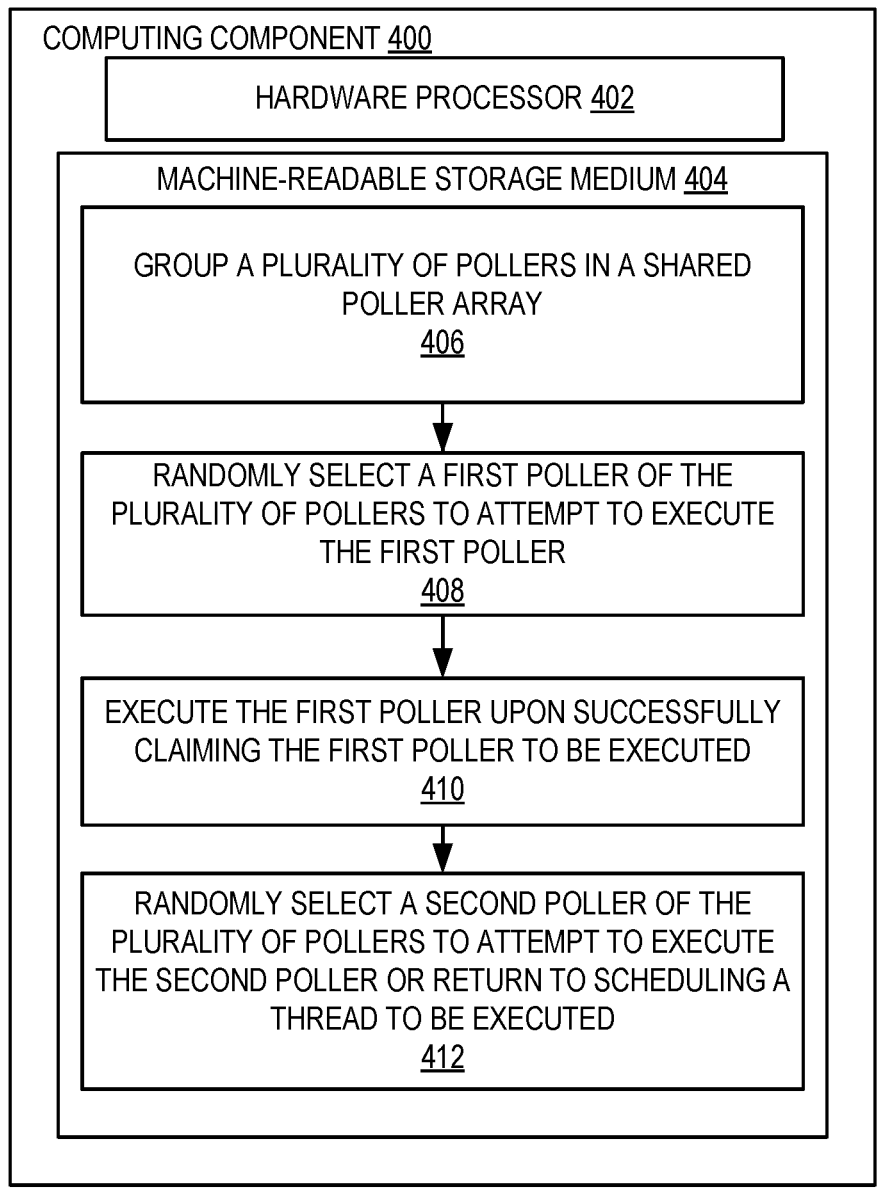
FIG. 4 illustrates an example computing component capable of executing instructions for effectuating polling in accordance with various embodiments.

FIG. 4 is an example computing device 400 in accordance with embodiments of the present disclosure. Where operations and functionality of computing device 400 are the same or similar to those discussed with respect to FIG. 2B, the description should be interpreted to apply. For example, computing device 400 may be an embodiment of a node, a node controller, a CPU such as CPU 10 or 30. Computing device 400 includes one or more hardware processors 402 that may be one or more central processing units (CPUs), semiconductor-based microprocessors, and/or other hardware devices suitable for retrieval and execution of instructions stored in machine-readable storage medium, 404. The one or more hardware processor 402 may fetch, decode, and execute instructions, such as instructions 406-414, to control processes or operations for effectuating error detection and control in the context of coherency directory caches in accordance with one embodiment. As an alternative or in addition to retrieving and executing instructions, the one or more hardware processors 402 may include one or more electronic circuits that include electronic components for performing the functionality of one or more instructions, such as a field programmable gate array (FPGA), application specific integrated circuit (ASIC), or other electronic circuits.

The one or more hardware processors 402 are configured to execute instructions stored on a machine-readable medium 404. Machine readable medium 404 may be one or more types of non-transitory computer storage mediums. Non-limiting examples include: flash memory, solid state storage devices (SSDs); a storage area network (SAN); removable memory (e.g., memory stick, CD, SD cards, etc.); or internal computer RAM or ROM; among other types of computer storage mediums. The instructions stored on the machine-readable medium 404 may include various sub-instructions for performing the function embodied by the identified functions.

The one or more hardware processors 402 may execute instruction 406 to group a plurality of pollers in a shared poller array. As described above, and similar to placing threads in a shared buffer ring to allow idle CPUs to steal work, pollers, e.g., pollers 240a-240c (FIG. 2B) can be aggregated in a shared poller array 240 to be selected for execution by a CPU, e.g., local CPU 200, in order to dynamically distribute polling threads amongst CPUs. An atomic running flag can be assigned to each poller in the shared poller array.

The use of an atomic running flag allows a poller to be randomly selected, where a CAS operation can be used to attempt to atomically set a selected poller's running flag. The one more hardware processors 402 may execute instruction 408 to randomly select a first poller of the plurality of pollers to attempt to execute the first poller. If the CAS operation succeeds, and the CPU can claim the first poller to be executed. As described above, a CPU may attempt to execute a poller in between scheduling threads to execute.

Thus, the one or more hardware processors 402 may execute instruction 410 to execute the first poller upon successfully claiming the first poller to be executed. After execution of the first poller, the CPU can release the first poller so that it can randomly selected for execution by, e.g., another CPU.

On the other hand, if the CAS operation fails, and the first poller cannot be claimed for execution, the CPU, in accordance with some embodiments, has two choices. That is, the one or more hardware processors 402 may execute instruction 412 to either randomly select a second poller of the plurality of pollers to attempt to execute the second poller, or the one or more hardware processors 402 may return to scheduling a thread to be executed. Again, the thread to be executed may be a next or subsequent thread, recalling that the polling architecture is interleaved between thread scheduling as disclosed above.

Figure 5:
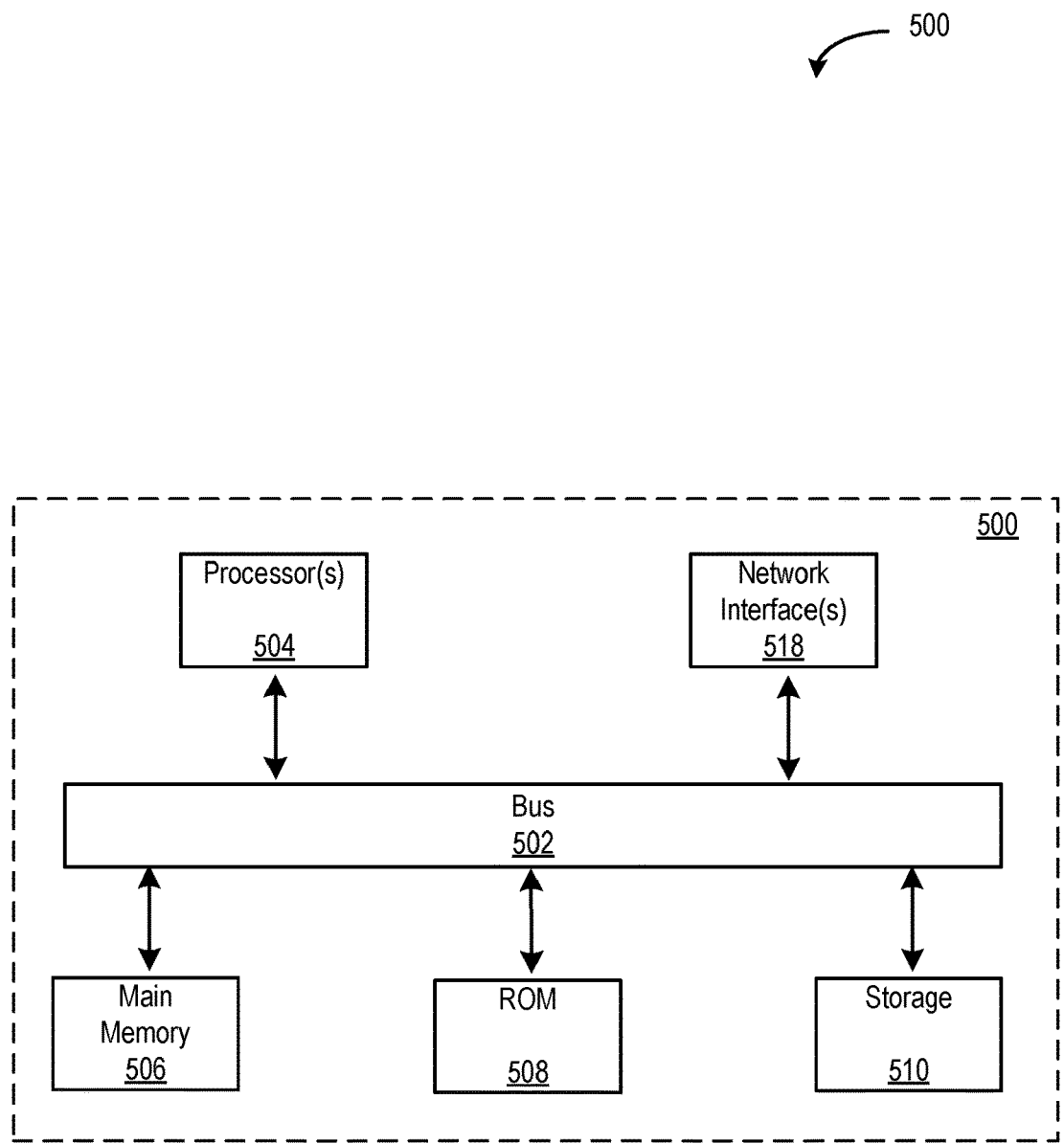
FIG. 5 illustrates an example computing component with which various features and/or functionality described herein may be implemented.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A central processing unit (CPU), comprising:
processing circuitry; and
a control unit extracting instructions from a memory unit, the instructions causing the control unit to:
execute, by the processing circuitry, respective threads held in a local run queue associated with the processing circuitry and a poller, wherein the control unit interleaves execution of the respective threads and the poller, and wherein executing the poller by the processing circuitry cause the poller to determine whether the CPU has a task to execute for a device external to the CPU;
upon clearing the local run queue, check a buffer shared amongst a group of CPUs, which includes the CPU and one or more additional CPUs, for threads to execute;
dequeue a batch of threads associated with the group of CPUs from the buffer;
place the batch of threads in the local run queue; and
execute, by the processing circuitry, a respective thread in the batch of threads from the local run queue.

2. The CPU of claim 1, wherein the CPU and the one or more additional CPUs reside in a same physical core or in a same non-uniform memory access (NUMA) socket.

3. The CPU of claim 2, wherein the instructions further cause the control unit to select the batch of threads based on an affinity for the CPU, the physical core, or the NUMA socket.

4. The CPU of claim 3, wherein the affinity indicates a higher priority to the same NUMA socket than the same physical core but not in the same NUMA socket.

5. The CPU of claim 1, wherein the instructions further cause the control unit to check the buffer for any remaining threads waiting to run on the CPU and execute the remaining threads prior to the dequeuing of the batch of threads.

6. The CPU of claim 1, wherein the instructions further cause the control unit to randomly select a first CPU with which the batch of threads is associated from the one or more additional CPUs.

7. The CPU of claim 6, wherein the instructions further cause the control unit to repeatedly perform the random selection of a subsequent CPU of the one or more additional CPUs in response to the first CPU not being associated with at least one ready-to-run thread.

8. The CPU of claim 7, wherein the instructions further cause the control unit to enter a sleep state upon reaching a threshold number of attempts for the random selection.

9. The CPU of claim 1, wherein the instructions further cause the control unit to execute a respective thread of the batch of threads based on a priority order.

10. The CPU of claim 1, wherein the instructions further cause the control unit to randomly select the poller from a shared poller array to be executed subsequent to execution of a thread in the local queue.

11. The CPU of claim 10, wherein the instructions further cause the control unit to execute the poller upon successfully claiming the poller to be executed from the shared poller array.

12. The CPU of claim 11, wherein executing the poller further causes the control unit to clear a running flag associated with the poller.

13. The CPU of claim 12, wherein the instructions further cause the control unit to clear the running flag upon the successful claiming of the poller to be executed based on a compare-and-swap operation being successful.

14. The CPU of claim 10, wherein the instructions further cause the control unit to randomly select a second poller from the shared poller array to be executed or determine a subsequent thread for execution.

15. The CPU of claim 10, wherein the instructions further cause the control unit to increment a delay order counter associated with a respective poller of the shared poller array in response to the selected poller finding no thread to execute.

16. The CPU of claim 15, wherein the instructions further cause the control unit to maintain a sequence number incrementable by the control unit each time the control unit randomly selects a poller from the shared poller array such that the control unit exhibits a preference for pollers having a smaller value of corresponding delay order counters.

17. The CPU of claim 16, wherein the instructions further cause the control unit to disregard the preference until the delay order counter reaches a maximum delay order value.

18. An apparatus, comprising:
processing circuitry; and
a control unit extracting instructions from a memory unit, the instructions causing the control unit to:
execute, by the processing circuitry, respective threads held in a local run queue associated with the processing circuitry and a poller, wherein the control unit interleaves execution of the respective threads and the poller, and wherein executing the poller by the processing circuitry cause the poller to determine whether the CPU has a task to execute for a device external to the CPU;
check a buffer shared amongst a group of apparatuses, which includes the apparatus and one or more additional apparatuses upon clearing the local run queue, for threads to execute;
dequeue a batch of threads associated with the group of apparatuses from the buffer;
place the batch of threads in the local run queue; and
execute, by the processing circuitry, a respective thread in the batch of threads from the local run queue.

19. The apparatus of claim 18, wherein the instructions further cause the control unit to select the poller from a shared poller array to be executed subsequent to execution of a thread in the local run queue.

20. The apparatus of claim 18, wherein the instructions further cause the control unit to randomly select a first apparatus with which the batch of threads is associated from the one or more additional apparatuses.

* * * * *